US009639797B2

(12) United States Patent
Cardullo (10) Patent No.: US 9,639,797 B2
(45) Date of Patent: May 2, 2017

(54) NANO RFID METHOD AND DEVICE

(76) Inventor: Mario W. Cardullo, Alexandria, VA (US)

(*) Notice: Subject to any disclaimer, the term of this patent is extended or adjusted under 35 U.S.C. 154(b) by 423 days.

(21) Appl. No.: 12/497,193

(22) Filed: Jul. 2, 2009

(65) Prior Publication Data

US 2010/0001846 A1    Jan. 7, 2010

Related U.S. Application Data

(60) Provisional application No. 61/078,115, filed on Jul. 3, 2008.

(51) Int. Cl.
*G08B 13/14* (2006.01)
*G06K 19/07* (2006.01)
*G06K 19/077* (2006.01)

(52) U.S. Cl.
CPC ... *G06K 19/0723* (2013.01); *G06K 19/07749* (2013.01); *G06K 19/07786* (2013.01); *H04Q 2213/13095* (2013.01)

(58) Field of Classification Search
USPC ......................................... 340/572, 10, 505
See application file for complete search history.

(56) References Cited

U.S. PATENT DOCUMENTS

| 6,243,012 | B1 * | 6/2001 | Shober ................. G01S 13/758 340/10.1 |
| 6,265,977 | B1 | 7/2001 | Vega et al. |
| 7,051,945 | B2 | 5/2006 | Empedocles |
| 7,232,460 | B2 * | 6/2007 | Van Erlach et al. ......... 623/1.15 |
| 8,115,618 | B2 * | 2/2012 | Robertson ........... A61B 1/00016 340/539.12 |
| 2002/0111551 | A1 * | 8/2002 | Erlach et al. ................. 600/423 |
| 2003/0032892 | A1 * | 2/2003 | Erlach et al. ................. 600/547 |
| 2006/0180647 | A1 * | 8/2006 | Hansen ..................... B60S 3/00 235/375 |
| 2007/0008115 | A1 * | 1/2007 | Morhard ............ G08B 13/2462 340/539.13 |
| 2007/0057781 | A1 * | 3/2007 | Breed .................... B60K 35/00 340/457.1 |

(Continued)

FOREIGN PATENT DOCUMENTS

KR    10-0394839    8/2003
KR    10-2008-0017247    2/2008

(Continued)

OTHER PUBLICATIONS

"Small-scale systems for in vivo drug delivery", David A. Lavan, et al. Nature Biotechnology, vol. 21, No. 10, Sep. 30, 2003, pp. 1184-1991.

(Continued)

*Primary Examiner* — Travis Hunnings
(74) *Attorney, Agent, or Firm* — Juneau & Mitchell; Todd L. Juneau (57) ABSTRACT

A nano RFID device or tag and method for using same is disclosed. The nano RFID device may be less than about 150 nanometers in size. The nano RFID device may be a passive, active or semi-passive nano RFID device. The nano RFID device may be included into other items or products such as being woven into a fabric, for example. The nano RFID device may include nano antennae that may comprise one or more carbon tubes. The nano RFID device may include a nano battery.

18 Claims, 5 Drawing Sheets

(56) References Cited

U.S. PATENT DOCUMENTS

| | | | |
|---|---|---|---|
| 2007/0115125 A1* | 5/2007 | Lyon | G06K 7/0008 340/572.1 |
| 2007/0152832 A1 | 7/2007 | Crowley | |
| 2007/0188325 A1* | 8/2007 | Morhard | G06Q 10/08 340/572.1 |
| 2007/0188330 A1* | 8/2007 | Morhard | G06K 19/06046 340/572.8 |
| 2007/0225055 A1* | 9/2007 | Weisman | A63F 1/14 463/11 |
| 2007/0281657 A1 | 12/2007 | Brommer | |
| 2008/0042849 A1 | 2/2008 | Saito et al. | |
| 2008/0156886 A1 | 7/2008 | Tsuchiya | |
| 2008/0231445 A1* | 9/2008 | Rodgers | G06Q 10/08 340/568.7 |
| 2008/0284599 A1* | 11/2008 | Zdeblick et al. | 340/572.1 |
| 2010/0001841 A1* | 1/2010 | Cardullo | 340/10.1 |
| 2010/0001846 A1* | 1/2010 | Cardullo | 340/10.4 |
| 2010/0007469 A1* | 1/2010 | Cardullo | 340/10.1 |
| 2010/0171596 A1* | 7/2010 | Burke | G06K 19/0717 340/10.4 |

FOREIGN PATENT DOCUMENTS

| | | |
|---|---|---|
| WO | WO 2004032191 | 4/2004 |
| WO | WO 2006 028195 | 3/2006 |
| WO | WO 2006-121920 | 11/2006 |
| WO | WO 2008 065991 | 6/2008 |

OTHER PUBLICATIONS

Notification of Transmittal of International Search Report and Written Opinion of the International Searching Authority, or the Declaration, International Search Report and Written Opinion of the International Searching Authority, from PCT Application PCT/US2009/049554, all mailed Feb. 2, 2010.

Notification of Transmittal of International Search Report and Written Opinion of the International Searching Authority, or the Declaration, International Search Report and Written Opinion of the International Searching Authority, from PCT Application PCT/US2009/049788, all mailed Jan. 27, 2010.

Notification of Transmittal of International Search Report and Written Opinion of the International Searching Authority, or the Declaration, International Search Report and Written Opinion of the International Searching Authority, from PCT Application PCT/US2009/050395, all mailed Feb. 2, 2010.

Supplemental European Search Report, European Patent Office, European Patent Application No. 09774530, mailed Aug. 8, 2011.

* cited by examiner

NANO RFID METHOD AND DEVICE

CROSS-REFERENCE TO RELATED APPLICATIONS

This application claim benefit and priority to U.S. Provisional Application No. 61/078,115 filed Jul. 3, 2008, entitled "NANO RFID METHOD AND DEVICE", the disclosure of which is incorporated by reference herein, in its entirety.

BACKGROUND OF THE INVENTION

1. Field of the Invention

The invention is directed to a method and device for nano radio frequency identification (RFID) and, more specifically, a method and device for nano RFID technology for use in tracking items using nano based tags.

2. Related Art

Many systems and methods exist for tracking items such as packages or shipping containers using RFID. Most RFID tags typically contain at least two parts. One is an integrated circuit for storing and processing information, modulating and demodulating a radio frequency (RF) signal, and other specialized functions. The second part is an antenna for receiving and transmitting the signal. A technology called chipless RFID allows for discrete identification of tags without an integrated circuit, thereby allowing tags to be printed directly onto assets at a lower cost than traditional tags.

Passive RFID tags typically have no internal power supply. The electrical current induced in the antenna by the incoming radio frequency signal provides just enough power for the Complimentary Metal-Oxide Semi-Conductor integrated circuit in the tag to power up and transmit a response. Most passive tags signal by backscattering a carrier wave from a reader. This means that the antenna has to be designed both to collect power from the incoming signal and also to transmit the outbound backscatter signal. The response of a passive RFID tag is not necessarily just an ID number; the tag chip can contain non-volatile, perhaps writable EEPROM for storing data.

Semi-passive tags are similar to active tags in that they have a power source, but only powers the micro-circuitry and does not power the broadcasting of the signal. The response is typically powered by the backscattering of the RF energy from the reader.

However, the current technology for all these types of tags, passive and active, still requires relatively "large" physical packaging. Because of the size constraints, applications requiring RFID technology may be unduly restrictive.

Accordingly, there is a need for a method and device for providing RFID technology with a smaller form factor so that a wider range of application may practical.

SUMMARY OF THE INVENTION

The invention meets the foregoing need and provides for a nano RFID device and related method suitable for use in applications requiring a tracking device of a few hundred nanometers or smaller in size. The nano RFID device constructed according to principles of the invention may be embedded into compositions, fabrics, objects, or the like, such as for example, and not limited to, clothing, objects associated with clothing (e.g., buttons, tags, bands, elastic threads, emblems, clasps, zippers, or the like), plastic, resins, commercial products or the like.

In some applications, the nano RFID device, when constructed according to principles of the invention, may be woven into the fabric (or similar material), and/or constructed as part of the material's basic structure such as one of the threads, for example. In this type of application, this might include encasing the nano-RFID device within a filament such as when constructing rayon material, polyester material, plastic type material, or the like.

In another exemplary application, the nano RFID device, when constructed according to the inventive principles herein, may be embedded into a sub-assembly or a basic component of an end product that, when assembled, has the nano RFID device associated with it for tracking purposes.

Accordingly, in one aspect of the invention, a nano radio frequency identification (RFID) device is provided that includes a radio frequency (RF) section configured to send an RF signal and at least one antenna operatively coupled to the RF section for emitting the RF signal, wherein the nano RFID device is configured to be less than about 150 nanometers in each of width, length and thickness.

In another aspect, a method for using a nano radio frequency identification (RFID) device, the nano RFID device includes a radio frequency (RF) section configured to emit an RF signal and at least one antenna operatively coupled to the RF section to emit the signal, wherein the nano RFID device is configured to be less than about 150 nanometers in each of width, length and thickness, the method including configuring identification data within the nano RFID device that identifies the RFID device and embedding the nano RFID device within an item or composition for tracking the item or composition.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention, are incorporated in and constitute a part of this specification, illustrate embodiments of the invention and together with the detailed description serve to explain the principles of the invention. No attempt is made to show structural details of the invention in more detail than may be necessary for a fundamental understanding of the invention and the various ways in which it may be practiced. In the drawings.

DETAILED DESCRIPTION OF THE INVENTION

It is understood that the invention is not limited to the particular methodology, protocols, etc., described herein, as these may vary as the skilled artisan will recognize. It is also to be understood that the terminology used herein is used for the purpose of describing particular embodiments only, and is not intended to limit the scope of the invention. It also to be noted that as used herein and in the appended claims, the singular forms "a," "an," and "the" include the plural reference unless the context clearly dictates otherwise. Thus, for example, a reference to "an address" is a reference to one or more addresses and equivalents thereof known to those skilled in the art.

Unless defined otherwise, all technical and scientific terms used herein have the same meanings as commonly understood by one of ordinary skill in the art to which the invention pertains. The embodiments of the invention and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the invention. The examples used herein are intended merely to facilitate an understanding of ways in which the invention may be practiced and to further enable those of skill in the art to practice the embodiments of the invention. Accordingly, the examples and embodiments herein should not be construed as limiting the scope of the invention, which is defined solely by the appended claims and applicable law. Moreover, it is noted that like reference numerals reference similar parts throughout the several views of the drawings.

The method and device of the invention includes providing a nano radio frequency identification (RFID) device (RFID tag) of about 150 nanometers or smaller in dimension. In some embodiments, the RFID device may include semiconductors as small as is 90-nm, perhaps with some chips configured and provided at the 65-nm, 45-nm and/or 30-nm size level, in view of the current cutting edge state-of-the-art in nano-fabrication. The technology for the included electrical circuitry may include CMOS or related technology for low power consumption. A nano RFID device constructed by nanotechnology techniques provides advantages over the currently available RFID devices such as permitting the RFID device to be woven into cloth, or embedded into other materials, when they are fabricated. This provides an embedded tracking mechanism (i.e., RFID) that may not be easily removed or damaged.

Figure 1:
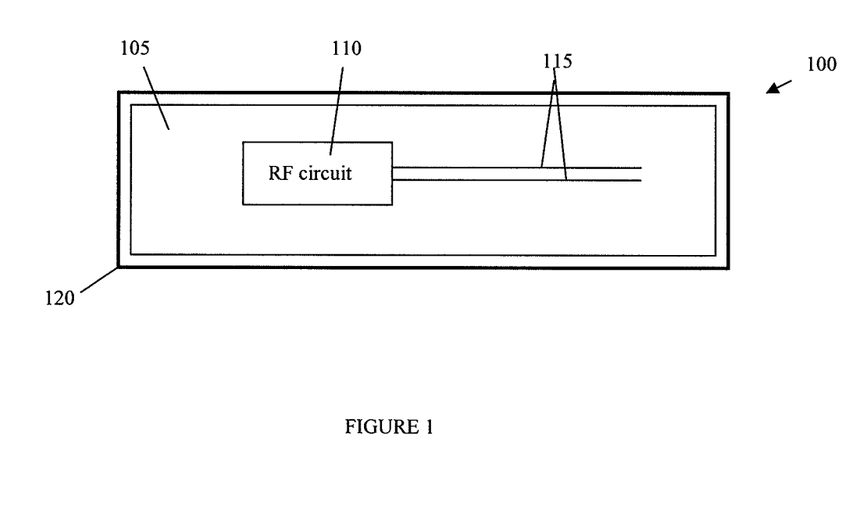
FIG. 1 is a block diagram of an embodiment of a nano RFID device constructed according to principles of the invention.

FIG. 1 is a block diagram of an embodiment of a passive nano RFID component, generally denoted by reference numeral 100. The component 100 may include a nano RFID device 105 that may include a radio frequency circuit (RF) 110 that may be configured to respond to a received RF signal and to provide identifying information of the nano RFID device 105 which may be associated with a composition, item, product, person, or similar object. Alternatively, in some applications, the nano RF circuit 110 may provide identifying information of device 105 when not triggered by the received RF signal.

Moreover, the identifying information may be electronically encoded alphanumeric data to uniquely identify the nano-RFID device 105. The RF circuit 110 may also be configured with a memory (not shown), such as EEROM or EEPROM, for example, to store other information that may be transmitted along with the identifying information. The nano RFID device 105 may also include antennae 115 that may receive an RF signal and also emit a response signal as generated by the RF circuit 110. The antennae 115 may be at least one, preferably two, carbon nano tubes or other nano materials suitable for RF reception and emission such as transmitting the outbound backscatter signal. Also shown as part of the general nano RFID component 100 is a protective layer 120, such as a plastic coating or other suitable composition that provides environmental protection for the nano-RFID device 105. The nano-RFID device 105 may have a size of about 150 nanometers, or smaller, in all dimensions (length, width and thickness).

Figure 2:
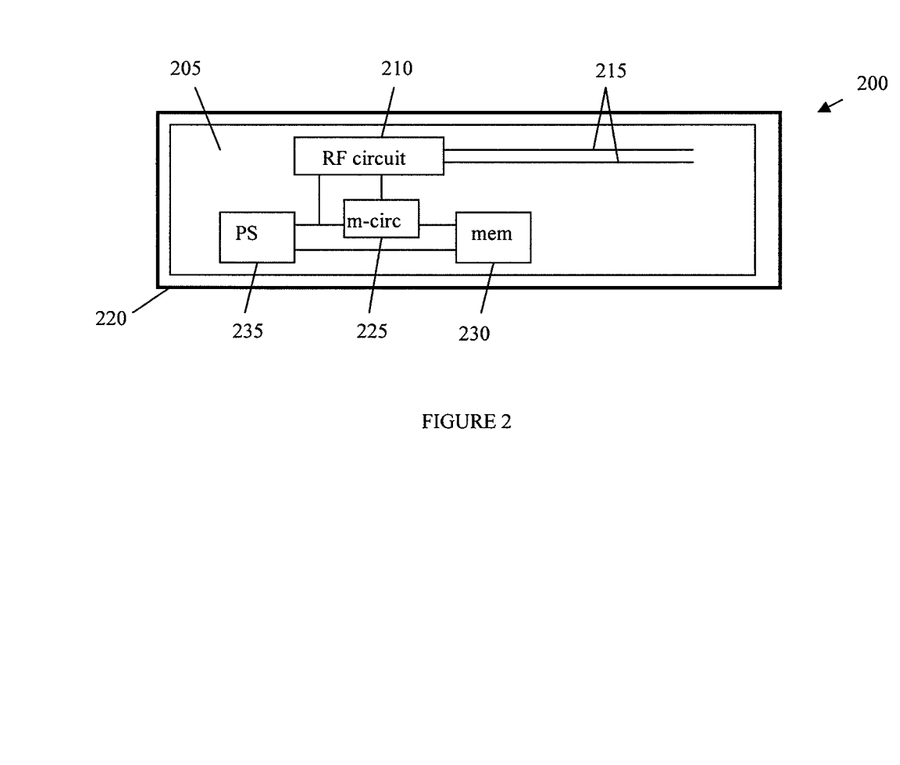
FIG. 2 is a block diagram of another embodiment of a nano RFID device constructed according to principles of the invention.

FIG. 2 is a block diagram of an embodiment of active nano RFID component, generally denoted by reference numeral 200. The nano RFID component 100 may include an active nano RFID device 205 and may include a radio frequency circuit (RF) 210 that is configured to receive a RF signal and configured to emit data as initiated by the RF circuit 210 or as initiated by the micro-circuit 225 (which may comprise a micro-processor, or the like) that provides additional processing and control capability. The emitted data may include identifying information of the active nano RFID device 205, which may be associated with a composition, item, product, person, or similar object. The identifying information may be electronically encoded alphanumeric data to uniquely identify the nano-RFID device 205. The active nano device 205 may also be configured with a memory 230, such as EEROM or EEPROM, for example, to store the identifying data, and/or other information that may be transmitted along with the identifying information.

The active nano device 205 may also include a nano power source 235 such as a nano battery, for example. The power source 235 may be fabricated as a nano chemical-battery or nano bio-battery, as is known in the art. The power source 235 may be configured to provide power to the RF circuit 210, micro-circuit 225 and memory 230. The power source 235 may provide sufficient power to cause a stronger response signal, hence greater transmission distances, as compared with a passive nano RFID device, such as shown in relation to FIG. 1, for example. Antennae 215 may receive an RF signal and also emit a response signal as generated by the RF circuit 210 that may be initiated by the micro-circuit 225. The antennae 215 may be at least one, preferably two, carbon nano tubes or other nano materials suitable for RF reception and emission such as transmitting the outbound backscatter signal. Also, the nano RFID component 200 may involve a protective layer 220, such as a plastic coating or other suitable composition that provides environmental protection for the nano-RFID device 205. The RF circuit 210 and the micro-circuit 225 may be combined in some embodiments. The nano device 205 may have a size of about 150 nanometers, or smaller, in all dimensions (length, width and thickness).

Figure 3:
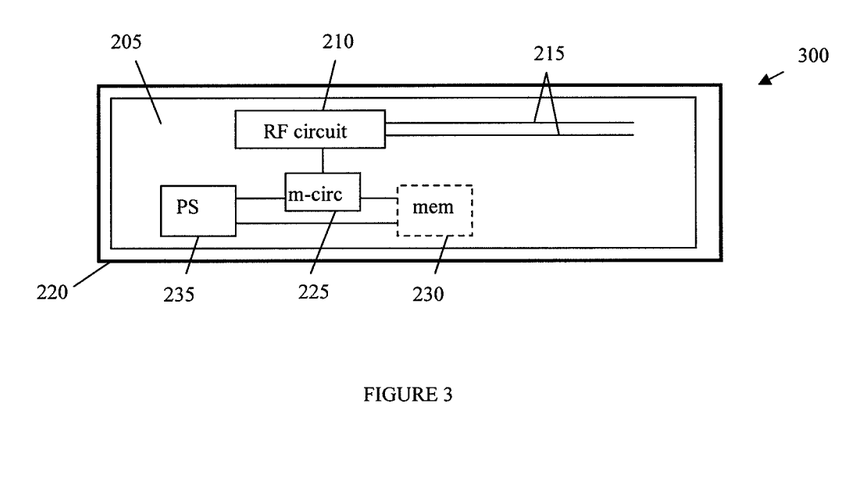
FIG. 3 is a block diagram of another embodiment of a nano RFID device constructed according to principles of the invention.

FIG. 3 is a block diagram of an embodiment of a semi-passive nano RFID component, generally denoted by reference numeral 300. The embodiment of FIG. 3 may be configured similarly to the device of FIG. 2, except that the nano power source 235 does not power the response signal, rather the response signal may be provided in the same manner as a passive nano RFID device (such as shown in FIG. 1, for example) by backscatter techniques. However, in some embodiments, the RF circuit 210 may be powered at least in part by the nano power source 235 for interacting with the micro-circuit 225 for exchange of information (perhaps as contained in memory 230), such as identification data, and so that the exchanged information may be transmitted (or received by micro-circuit 225), as appropriate. The nano RFID component 300 excluding protective layer 220 may have a size of about 150 nanometers, or smaller, in all dimensions (length, width and thickness).

Figure 4:
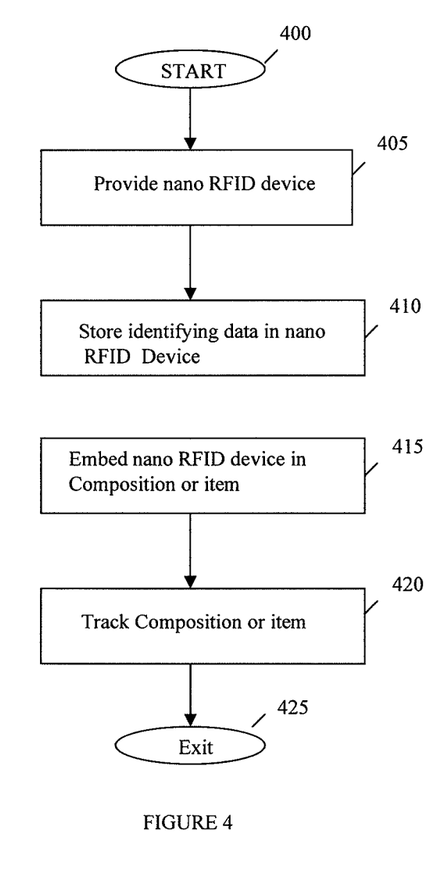
FIG. 4 is a flow diagram of an exemplary process performed according to principles of the invention and using a nano RFID device constructed according to principles of the invention, such as one of the nano RFID devices shown in relation to FIGS. 1-3.

FIG. 4 is a flow diagram of using an embodiment of a nano-RFID device of FIG. 1, 2 or 3, according to principles of the invention, starting at step 400. At step 405, a nano RFID device (i.e., nano RFID tag) may be provided, such as any of the nano RFID devices shown in relation to FIGS. 1-3. At step 410, the nano RFID device may be initialized or configured with identifying data unique to the particular nano RFID device, and/or unique to an item, composition, person or object associated with the nano RFID device. This may be, for example, a serial number, a product code, a name, an encoded identifier, or the like. At step 415, the nano RFID device may be embedded in, or attached to, a composition or material, item, or product. For example, the nano RFID device may be woven directly into a fabric material such as cloth (maybe as part of a thread). At step 420, the composition, material, product or similar object may be tracked by RFID techniques and the resulting identification information received by the RFID exchange processed according an application or system using the nano RFID device. At step 425, the process ends.

Figure 5:
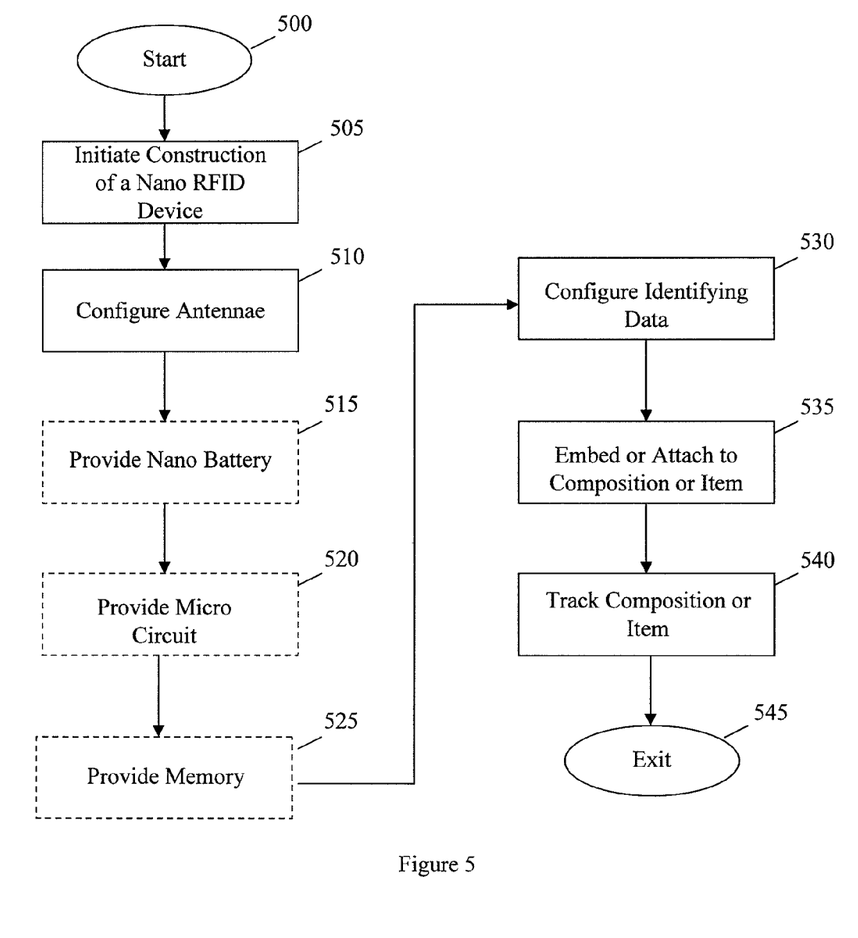
FIG. 5 is a flow diagram of a process for constructing and/or using a RFID device, according to principles of the invention.

FIG. 5 is a flow diagram of a process for constructing and/or using an RFID device, according to principles of the invention, starting step 500. At step 505, a RFID nano construction process may be initiated to fabricate a nano RFID device of about 150 nanometers or smaller in dimension. At step 510, one or more antenna may be configured, such as a pair of carbon nano-tubes. At optional step 515, a nano battery may be provided and configured (e.g., for an active type RFID device). At step 520, an optional micro-circuit may be provided for generating a RF message (e.g., for an active type RFID device). At step 525, a memory may be provided (e.g., for an active type RFID device). At step 530, identifying data may be configured that identifies the RFID device and may be a serial number, name, encoded identifier, product code, or the like. At step 535, the RFID device may be embedded or attached to a composition or item. At step 540, an item or composition may be tracked by tracking a location and/or movement of the RFID device that is embedded or attached to the item or composition. At step 545, the process may exit.

In some applications, the identification information within a nano RFID device may be duplicated among more than one nano RFID device, so that more than one nano RFID device may have the same identification information, or at least a subset of the same information. This capability may be useful in those applications where an associated item, perhaps a large coat, for example, might require multiple nano RFID devices to be present in different parts of the coat, such as the two arms for instance. In this case, the identification data may be the same identifying data in all the nano RFID devices woven into the coat.

Related technology that may provide an expanded description of various techniques and principles herein may be found in one or more publications such as, for example: "Nanophysics and Nanotechnology: An Introduction to Modern Concepts in Nanoscience," Edward L. Wolf, Wiley-VCH; 2 edition (October 2006); "Springer Handbook of Nanotechnology," Springer, 2nd rev. and extended ed. edition (March 2007); "Introduction to Nanoscale Science and Technology (Nanostructure Science and Technology)," Springer, $1^{st}$ edition (June 2004); "Fundamentals of Microfabrication: The Science of Miniaturization," Marc J. Madou, CRC, 2 edition (Mar. 13, 2002); "RFID Essentials (Theory in Practice)," O'Reilly Media, Inc. (January 2006); "RFID Applied" by Jerry Banks, David Hanny, Manuel A. Pachano, Les G. Thompson, Wiley (Mar. 30, 2007); "Carbon Nanotubes: Properties and Applications" by Michael J. O'Connell, CRC (May 2006); and "Nanoscale Science and Technology" by Robert Kelsall, Ian Hamley, Mark Geoghegan, Wiley (April 2005), all publications referred to herein are incorporated by reference in their entirety.

While the invention has been described in terms of exemplary embodiments, those skilled in the art will recognize that the invention can be practiced with modifications in the spirit and scope of the appended claims. These examples given above are merely illustrative and are not meant to be an exhaustive list of all possible designs, embodiments, applications or modifications of the invention. Moreover, any document, publication or patent referred to herein is incorporated by reference in its entirety.

What is claimed is:

1. A nano radio frequency identification (RFID) tag device, comprising:
   a radio frequency (RF) CMOS integrated circuit configured to send an RF signal;
   a microcircuit connected to the RF CMOS integrated circuit;
   a memory connected to the microcircuit and configured to store identifying information;
   a power source configured to power the RF CMOS integrated circuit, the microcircuit, and the memory; and,
   at least two nanotube antennas operatively coupled to the RF CMOS integrated circuit,
   wherein the RF CMOS integrated circuit is configured to receive an interrogating RF signal from an RFID reader,
   wherein in response to the interrogating RF signal, the RF CMOS integrated circuit is configured to communicate with the microcircuit and to emit a powered, active broadcast reply to the RF signal,
      wherein the nano RFID tag device is less than about 150 nanometers in width and/or length.

2. The nano RFID tag device of claim 1, further comprising a protective covering on the at least two nanotube antennas.

3. The nano RFID tag device of claim 1, wherein the RF CMOS integrated circuit is also configured to respond by backscattering a received signal.

4. The nano RFID tag device of claim 1, wherein the RF CMOS integrated circuit is configured to respond with data identifying the nano RFID tag device.

5. The nano RFID tag device of claim 1, wherein the nano RFID tag device is associated with at least any one of an item, a composition and an object to provide tracking information.

6. The nano RFID tag device of claim 1, wherein the power source is a nano bio-battery.

7. The nano RFID tag device of claim 1, wherein the power source powers the RF CMOS integrated circuit at least in part and the emitted signal is emitted by backscatter.

8. The nano RFID tag device of claim 1, wherein the RF CMOS integrated circuit is further configured to be responsive to a received RF signal and a first antenna of the at least two antennas is configured to receive the RF signal, and a second antenna of the at least two antennas is configured to emit the powered, active broadcast reply.

9. A method for using the nano radio frequency identification (RFID) tag device of claim 1, comprising: configuring identification data within the memory of the nano RFID tag device that identifies the nano RFID tag device; and embedding the nano RFID tag device within an item or composition for tracking the item or composition.

10. The method of claim 9, wherein the item comprises cloth-like material.

11. The method of claim 9, further comprising tracking the nano RFID tag device by using an emitted signal bearing the identification data.

12. A composition or material item containing the nano RFID tag device of claim 1.

13. The nano RFID tag device of claim 1, wherein the nano RFID tag device is less than about 90 nanometers in width and/or length.

14. The nano RFID tag device of claim 1, wherein the nano RFID tag device is less than about 65 nanometers in width and/or length.

15. The nano RFID tag device of claim 1, wherein the nano RFID tag device is less than about 45 nanometers in width and/or length.

16. The nano RFID tag device of claim 1, wherein the nano RFID tag device is less than about 30 nanometers in width and/or length.

17. The method of claim 9, further comprising the step of embedding a second nano RFID tag device within the item or composition for tracking the item or composition.

18. The composition or material item of claim 12, further comprising a second nano RFID tag device within the item or composition.

\* \* \* \* \*